United States Patent
Hirano

(10) Patent No.: US 6,970,984 B2
(45) Date of Patent: Nov. 29, 2005

(54) DIGITAL SIGNAL PROCESSOR AND MODEM USING THE SAME

(75) Inventor: Yasutoshi Hirano, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 381 days.

(21) Appl. No.: 09/955,885

(22) Filed: Sep. 19, 2001

(65) Prior Publication Data

US 2002/0038409 A1 Mar. 28, 2002

(30) Foreign Application Priority Data

Sep. 26, 2000 (JP) .......................................... 2000-292289

(51) Int. Cl.⁷ ............................. G06F 13/14; G06F 1/10
(52) U.S. Cl. ........................ 711/154; 711/147; 713/601; 375/222
(58) Field of Search ............................... 711/154, 147, 711/166–167; 713/310, 322, 500, 600–601; 375/222; 712/35–36; 709/213, 216; 717/168, 172–174, 177–178

(56) References Cited

U.S. PATENT DOCUMENTS

| | | | | |
|---|---|---|---|---|
| 5,638,530 A | * | 6/1997 | Pawate et al. | 711/115 |
| 5,764,968 A | * | 6/1998 | Ninomiya | 713/601 |
| 5,790,817 A | * | 8/1998 | Asghar et al. | 710/311 |
| 5,870,595 A | * | 2/1999 | Oki | 713/601 |
| 6,029,061 A | * | 2/2000 | Kohlschmidt | 455/574 |
| 6,088,785 A | * | 7/2000 | Hudson et al. | 712/35 |
| 6,584,588 B1 | * | 6/2003 | Pawate et al. | 714/719 |

FOREIGN PATENT DOCUMENTS

| | | | | |
|---|---|---|---|---|
| JP | 401264034 A | * | 10/1989 | 375/222 |
| JP | 6164655 | | 6/1994 | |
| JP | 9311845 | | 12/1997 | |
| JP | 200040028 | | 2/2000 | |

* cited by examiner

Primary Examiner—Denise Tran

(57) ABSTRACT

A signal processing apparatus includes a digital signal processor (DSP) including an internal memory part storing a program to carry out, an external memory part storing all programs to carry out in the DSP, a clock signal generating part for generating and outputting a clock signal to the DSP, and a clock signal control part for controlling to output said clock signal to the DSP. More particularly, the clock signal control part forwards the programs outputted from the external memory part to the internal memory after the clock signal generating part stops outputting the clock signal to the DSP.

17 Claims, 4 Drawing Sheets

DIGITAL SIGNAL PROCESSOR AND MODEM USING THE SAME

BACKGROUND OF THE INVENTION

1. Field of the Invention

The present invention generally relates to a digital signal processor and a modem using the digital signal processor, and more particularly, to a digital signal processor having an external ROM storing a program, forwarding a program to be executed to an internal program RAM if necessary, and executing an instruction stored in the internal program RAM, and a modem using the digital signal processor.

2. Description of the Related Art

Recent progress of digital signal processor (DSP) has expanded the scale of a processable digital signal process. The scale of a program RAM provided in the DSP is limited due to cost problems and the like.

Therefore, for execution of a program that is beyond the capacity of the internal program RAM of a small scale, an external ROM having an area for storing programs is used together with the DSP. The program is read from the external ROM and is transferred to the internal program RAM of the DSP as necessary. For instance, Japanese Laid-Open Patent Application No. 9-31184 discloses a signal processing apparatus using a DSP as described above. The signal processing device includes a plurality of DSPs and a ROM that is provided outside of the DSPs and stores programs. Programs are transferred from the ROM to internal program RAMs of the DSPs at the time of starting up the apparatus. The DSPs execute the programs stored in the internal program RAMs. Another signal processing apparatus is disclosed in Japanese Laid-Open Patent Application No. 2000-40028. The apparatus has external ROM storing programs, a DP-RAM and a CPU, these components being provided outside of a DSP. The CPU forwards a program needed to the DP-RAM from the external ROM. Then, a reset signal that has been applied to the DSP is removed. This results in activating the DSP, which fetches the program from the DP-RAM and stores it in an internal program RAM. Then, the DSP starts to execute the program in the internal program RAM. However, Japanese Laid-Open Patent Application No. 9-31184 and the Japanese Laid-Open Patent Application No. 2000-40028 have the following disadvantage. When the program in the program RAM built in the DSP is replaced, the re-set signal is asserted to the DSP. After the program is replaced by another program, the DSP is initialized. For a DSP having an I/O port, it is therefore necessary to reset the I/O port for each replacement. This degrades the performance of the DSP. In the meantime, recent progress of the DSP has made it possible to implement data modulation/demodulation of a modem by DSP and to improve the transmission rate. Nowadays, an increased number of modulation/demodulation formula is available. However, it is difficult in terms of cost to store all programs respectively describing the modulation/demodulation formula in the internal program RAM in the DSP.

In addition, new recommendations about the modem are added with a short cycle. In order to follow the new recommendations, it is necessary to replace the DSP by a new DSP in which programs corresponding to the new recommendations are described. This is disadvantageous to manufacturers and customers. Taking into account the above, a recent modem is equipped with a DSP having a small-scale program RAM and a rewritable ROM provided outside of the DPS. A program stored in the ROM is transferred to the program RAM in the DSP as necessary. The use of the external ROM easily copes with addition of recommendations by updating. Japanese Laid-Open Patent Application No. 6-164655 discloses a modem which uses a DSP having an external ROM storing a program, forwarding a program to be executed from the ROM to an internal program RAM, and executing instructions stored in the internal program RAM.

However, the program for data modulation/demodulation should be replaced promptly in the modem with the DSP because the replacement is carried out during communication.

Conventionally, a reset signal is asserted to the DSP for replacement of program, and is removed to activate the DSP. Just after activation following the removal of the reset signal, an internal parameter in the DSP and a parameter in an analog front end (AFE) have been initialized by the reset signal. Thus, it is necessary to reset the above parameters. Accordingly, it takes a long time to start the modulation/demodulation program and communication may be broken down in practice.

Furthermore, even for the same data modulation/demodulation formula, parameters with respect to the receiving and transmission are changed based on the change of a carrier frequency and a modulation rate although the algorithm is unchanged. In the above state, it is necessary to change all programs in compliance with the change of the carrier frequency and the modulation rate, because the internal program RAM is initialized by the reset signal and it is impossible to change a part of the program. Otherwise, it is necessary to load every parameter to the program RAM with the same modulation form.

However, there is a problem that it takes a long time to change all programs. There is another program that loading of every parameter needs a large scale of the internal program RAM, which increases the cost.

SUMMARY OF THE INVENTION

Accordingly, it is a general object of the present invention to provide a novel and useful digital signal processor and a modem using the digital signal processor in which the problems described above are eliminated.

Another and more specific object of the present invention is to provide a signal processing apparatus in which programs stored in a external memory part can be forwarded to an internal memory part without resetting a DSP, by controlling outputting of a clock signal.

The above objects of the present invention are achieved by a signal processing apparatus including a digital signal processor including an internal memory part storing a program to be executed; an external memory part storing programs executable in the digital signal processor; a clock signal generating part generating a clock signal and outputting the clock signal to the digital signal processor; and a clock signal control part controlling outputting of the clock signal to the digital signal processor so that the programs stored in the external memory part can be forwarded to the internal memory part. More particularly, the clock signal control part forwards the programs read from the external memory part to the internal memory after stopping outputting the clock signal to the digital signal processor. Accordingly, the programs stored in the external memory part can be forwarded to the internal memory part without resetting the DSP in case of that it is necessary to replace the program during that the DSP is working. It is possible to execute a large scale program by using small scale internal memory whose memory scale is small without falling a level of performance of the DSP. Besides, it is possible to save consumption electricity because it is stopped to supply a clock signal to the DSP during that the program in the internal memory is replaced.

It is also an object of the present invention to provide a signal processing apparatus, wherein the clock signal control part controls outputting of the clock signal to the digital signal processor in compliance with a request from the digital signal processor. Accordingly, it is possible to replace the internal program memory without initializing of the DSP in compliance with a request from the DSP.

Besides, it is an object to provide a signal processing apparatus, wherein the clock signal control part controls outputting of the clock signal to the digital signal processor in compliance with a request from an outside of the signal processing apparatus. Accordingly, it is possible to replace the internal program memory without a request from an outside of the signal processing apparatus. Therefore, it is possible to correspond a primary factor of replacing a program detected by the outside host processor, so that flexible system design can be done.

Furthermore, it is an object to provide a signal processing apparatus, wherein the clock signal control part includes a forward circuit for forwarding a desired part of the programs read from the external memory part to the internal memory. Accordingly, it is possible to replace the program in a short period of time, so that it is possible to control to replace the program closely.

Still another object of the present invention is to provide a modem for modulating/demodulating a communication data by using a signal processing apparatus including a digital signal processor including an internal memory part storing a program to be executed; an external memory part storing programs executable in the digital signal processor; a clock signal generating part for generating a clock signal and outputting the clock signal to the digital signal processor to the digital signal processor; and a clock signal control part controlling outputting of the clock signal to the digital signal processor so that the programs stored in the external memory part can be forwarded to the internal memory part. More particularly, the clock signal control part forwards the programs read from the external memory part to the internal memory after stopping outputting the clock signal to the digital signal processor.

Accordingly, it is not necessary to reset an inside parameters of the DSP and parameters of AFE after the program in the internal memory of the DSP, so that it is possible to execute the modulation/demodulation program immediately. Therefore, as compared with the modem in prior arts, it is possible to reduce the possibility of the cutting of the communication.

It is also an object to provide a modem, wherein the clock signal control part controls outputting of the clock signal to the digital signal processor in compliance with a request from the digital signal processor. Accordingly, it is possible to replace the internal program memory without initializing of the DSP in compliance with a request from the DSP.

Besides, it is an object to provide a modem, wherein said clock signal control part controls outputting of said clock signal to said digital signal processor in compliance with a request from an outside of said signal processing apparatus. Accordingly, it is possible to replace the internal memory partially in compliance with a request from an outside of said signal processing apparatus, so that it is possible to replace the program in a short period of time and it is possible to control to replace the program closely. Because the control is implemented by the host processor outside of the DSP signal processing apparatus, it is possible to correspond a primary factor of replacing a program detected by the host processor, so that flexible system design can be done.

It is also object to provide a modem, wherein the clock signal control part includes a forward circuit for forwarding a desired part of the programs read from the external memory part to the internal memory. Therefore, in case of that parameters only related to transmitting and receiving are different in a state where a carrier frequency and a modulation rate are different even if modular formulation is same, it is possible to keep the modulation formulation program and change only parameters. because it is possible to change not all but a part of the modulation/demodulation program.

Other objects and further features of the present invention will be apparent from the following detailed description when read in conjunction with the accompanying drawings.

DETAIL DESCRIPTION OF THE PREFERRED EMBODIMENTS

Figure 1:
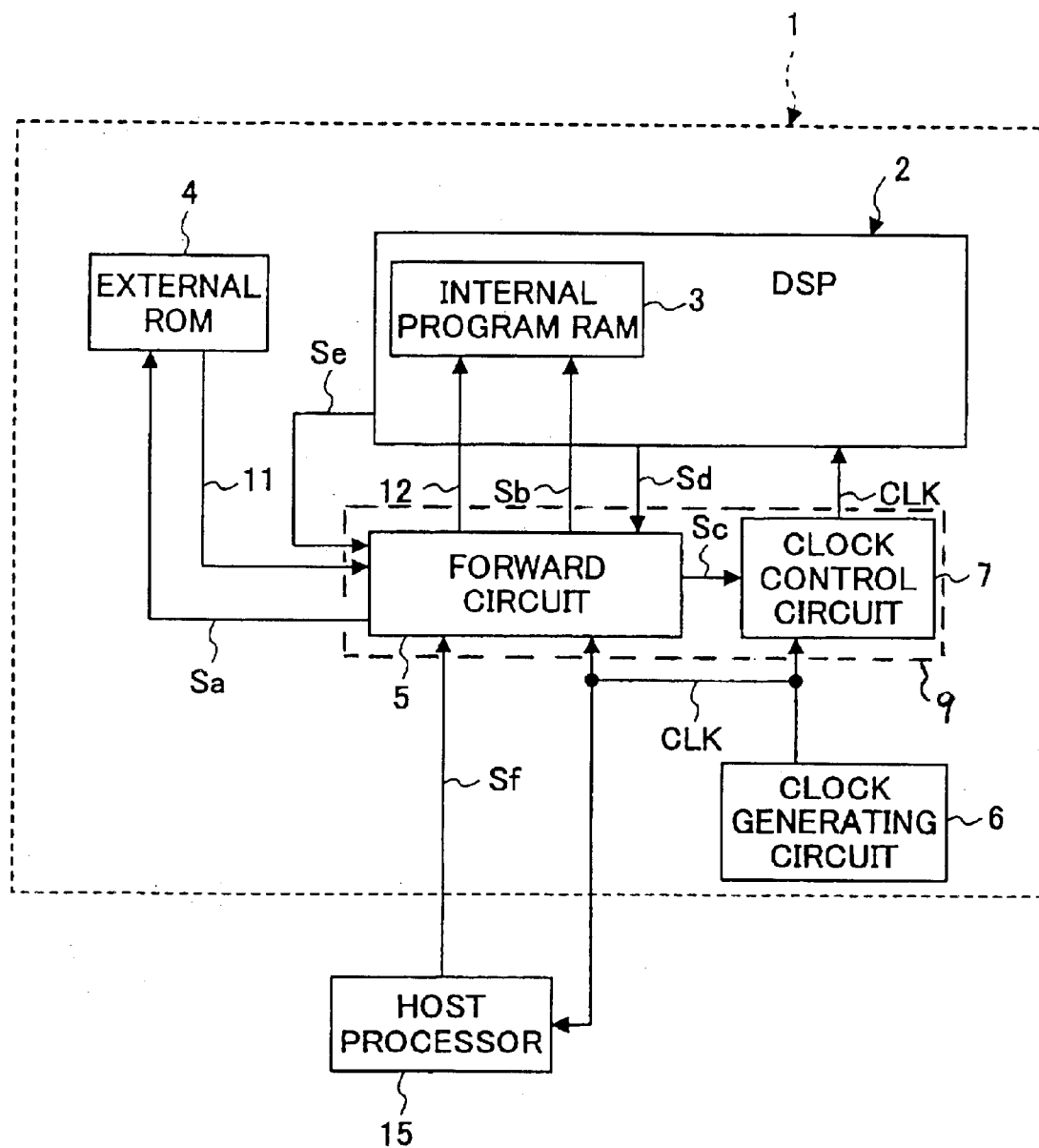
FIG. 1 is a block diagram showing an example of a DSP signal processing apparatus according to an embodiment of the present invention.

FIG. 1 is a block diagram of a DSP signal processing apparatus according to an embodiment of the present invention.

Referring to FIG. 1, a DSP signal processing apparatus 1 includes a DSP 2, an external ROM 4, and a forward circuit 5. The DSP 2 has an internal program RAM 3 in which a program to be executed is stored. The external ROM 4 stores all executable programs by the DSP 2. The forwarding circuit 5 forwards a desired program from the external ROM 4 to the internal program RAM 3. Besides, the DSP signal processing apparatus 1 includes a clock generating circuit 6 and a clock control circuit 7. The clock generating circuit 5 generates a clock signal CLK, which is supplied to the DSP 2 and the forwarding circuit 5. The clock control circuit 7 controls outputting of the clock signal CLK generated by the clock generating circuit 6 to the DSP 2. The forwarding circuit 5 and the clock control circuit 7 compose a clock signal control part 9.

The external ROM 4 and the forward circuit 5 are connected by a forward data bus 11. The forward circuit 5 and the internal program RAM 3 are connected by a forward data bus 12. Furthermore, the forward circuit 5 outputs a control signal Sa to the external ROM 4, a control signal Sb to the internal program RAM 3, and an output signal Sc to the clock control circuit 7.

Besides, a request signal Sd to replace the program stored in internal program RAM 3 and an internal state signal Se showing an access state to the internal program RAM 3 are respectively input from the DSP 2 to the forward circuit 5.

The clock generating circuit 6 outputs a generated signal to the forward circuit 5 and to the DSP 2 through the clock control circuit 7. Besides, a request signal Sf to replace the program stored in internal program RAM 3 may be input from an external host processor 15 to the forward circuit 5. In the above state, the clock signal CLK is input from the clock generating circuit 6 to the host processor 15.

The DSP 2 works on the basis of the inputted clock signal CLK, and stops working until the clock signal CLK inputs if the clock signal CLK is not inputted.

Under the above structure, actions of respective parts of the DSP signal processing apparatus 1 in a case where the request signal Sd to replace the program is input from DSP 2 to the forward circuit 5 will be explained as follows.

The DSP 2 outputs the request signal Sd to replace the program stored in internal program RAM 3 to the forward circuit 5. The forward circuit 5 detects a cycle in which the DSP 2 does not access the internal program ROM 3, namely in which the DSP 2 opens an internal program bus by a DSP inter state signal Se and outputs, to the clock control circuit 7, the control signal Sc requesting that the clock control circuit 7 does not output the clock signal CLK to the DSP 2.

The clock control circuit 7 stops outputting the clock signal CLK to the DSP 2 on the basis of the control signal Sc requesting that the clock signal CLK inputted from the forward circuit 5 stops being output to the DSP 2. After that, the forward circuit 5 reads out desired program data from the external ROM 4 by using the control signal Sa and the forward data bus 11, and forwards the program data read out to internal program RAM 3 by using the control signal Sb and the forward data bus 12.

The forward circuit 5 recognizes the place of the external ROM 4 from which the program is to be forwarded is read and the location and size of the internal program RAM 3 to which the program is to be forwarded, because a memory space, a memory size and the like with respect to the data to be forwarded are set in advance.

After finishing forwarding the program to the internal program RAM 3, the forward circuit 5 outputs, to the clock control circuit 7, the control signal Sc requesting the clock control circuit 7 supplies the clock signal CLK to the DSP 2. The clock control circuit 7 restarts supplying the clock signal CLK to the DSP 2. The DSP 2 starts working by the replaced program stored in the internal program RAM 3, on the basis of that the clock signal CLK is input to the DSP 2. Thus, it is finished to replace the program stored in the internal program RAM 3.

Figure 2:
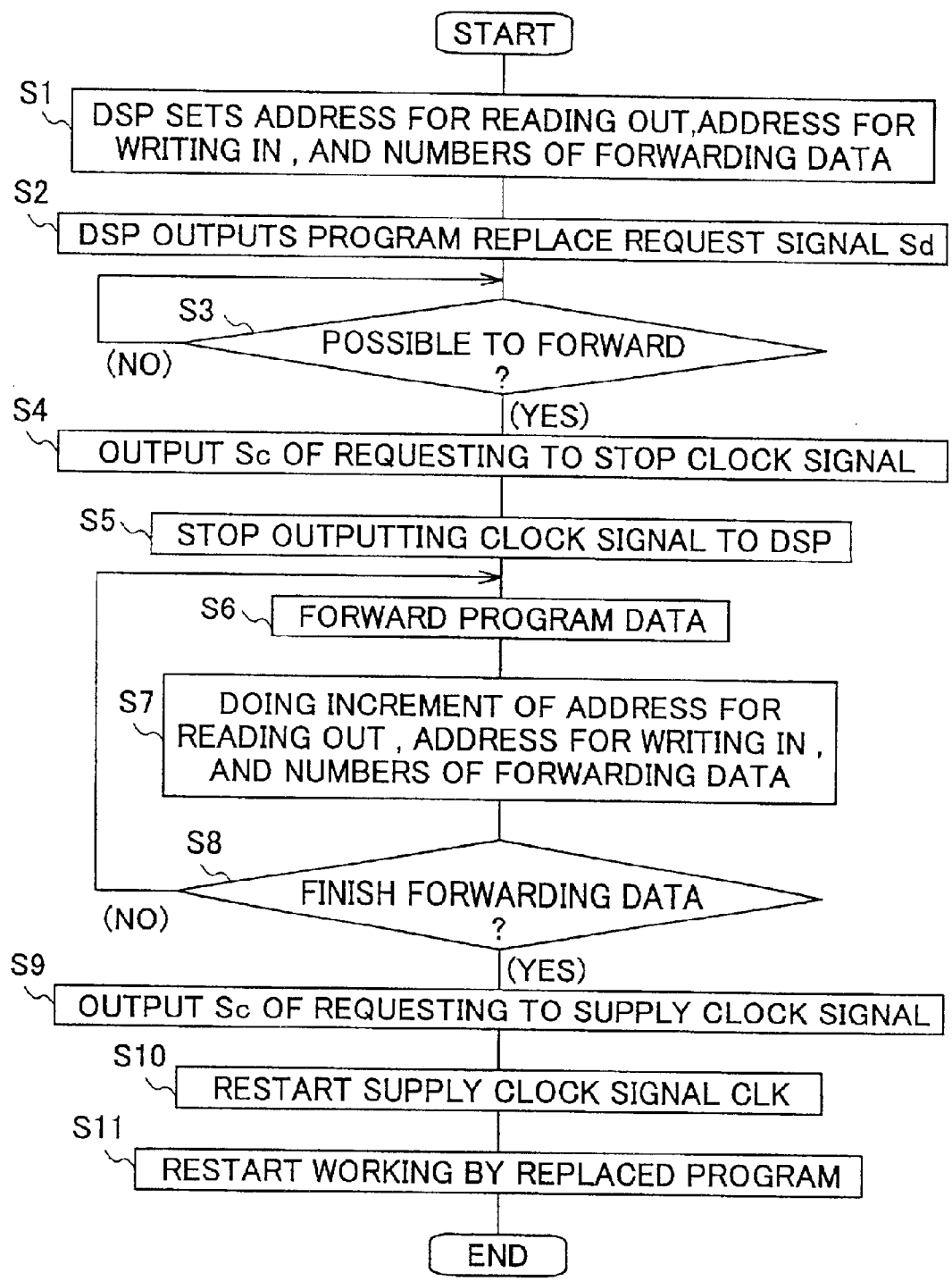
FIG. 2 is a flowchart showing an example of an action of the DSP signal processing apparatus of FIG. 1.

FIG. 2 is a flowchart showing an action of the changing the program in internal program RAM 3 of the DSP signal processing apparatus 1 shown in FIG. 1. Referring to FIG. 2, the actions of the respective parts of the DSP signal processing apparatus 1 in a case where the program in the internal program RAM 3 is replaced will be explained as follows.

Referring to FIG. 2, first of all, in step 1, the DSP 2 implements a setup process of the forward circuit 5, an address of external ROM 4 starting reading out the program data, an address of the internal program RAM 3 writing the program in, and the numbers of forwarding the data, with respect to the register in the forward circuit 5 and the like for instance.

Next, the DSP 2 outputs the request signal Sd to replace the program to the forward circuit 5 in step 2. In step 3, the forward circuit 5 investigates by the inside state signal Se whether or not it is possible to forward the program data to the internal program RAM 3, namely whether or not the DSP 2 is in a cycle in which the DSP 2 does not access to the internal program RAM 3. If YES to the step 3, that is, it is possible to forward the program data to the internal program RAM 3, the forward circuit 5 outputs the control signal Sc requesting the clock control circuit 7 stop outputting the clock signal CLK to the DSP 2 in step 4. If NO to the step 3, that is, it is not possible to forward the program data to the internal program RAM 3, the process of the step 3 continues implementing until it is possible to forward the program data to the internal program RAM 3.

Next, in step 5, the clock control circuit 7 stops outputting the clock signal CLK to the DSP 2, so that the DSP 2 stops working. In step 6, the forward circuit 5 reads out the desired program data from the external ROM 4 and writes it in the internal program RAM 3. And then, in step 7, the forward circuit 5 does increment of the address of the external ROM 4 reading out the program data, the address of the internal program RAM 3 writing the program data in, and the numbers of the program data which is finished forwarding, respectively, which are set up in the register in the forward circuit 5.

Next, in step 8, the forward circuit 5 confirms the number of the program data which is forwarded to the internal program RAM 3 and decides whether or not the data forwarding is finished, namely, whether or not the number of the program data which is forwarded is the predetermined numbers of the forwarding of program data.

If NO to the step 8, that is the data is not finished forwarding, the process goes back to the step 6. If YES to the step 8, that is the data is finished forwarding, the forward circuit 5 outputs the control signal Sc requesting that the clock control circuit 7 supplies the clock signal CLK to the DSP 2 in step 9. In step 10, the clock control circuit 7 restarts supplying the clock signal CLK to the DSP 2. The DSP 2 restart working by the program in the replaced internal program RAM 3 in step 11 and the present flow goes to end.

The case where the request signal Sd to replace the program is output from the DSP 2 to the forward circuit 5, as an example, is explained in the above. The case where the request signal Sf to replace the program is output from host processor 15 to the forward circuit 5, as an example, will be explained with a flowchart of FIG. 3 as follows. The same flow as one in FIG. 2 is mentioned with the same mark in FIG. 3 and the explanation with respect to the same flow will be omitted and only different points from the flow in FIG. 2 will be explained. As compared with the flow in FIG. 2, the step 1 of FIG. 2 is exchanged to a step 21 in FIG. 3 and the step 2 of FIG. 2 is exchanged to a step 22 in FIG. 3.

Figure 3:
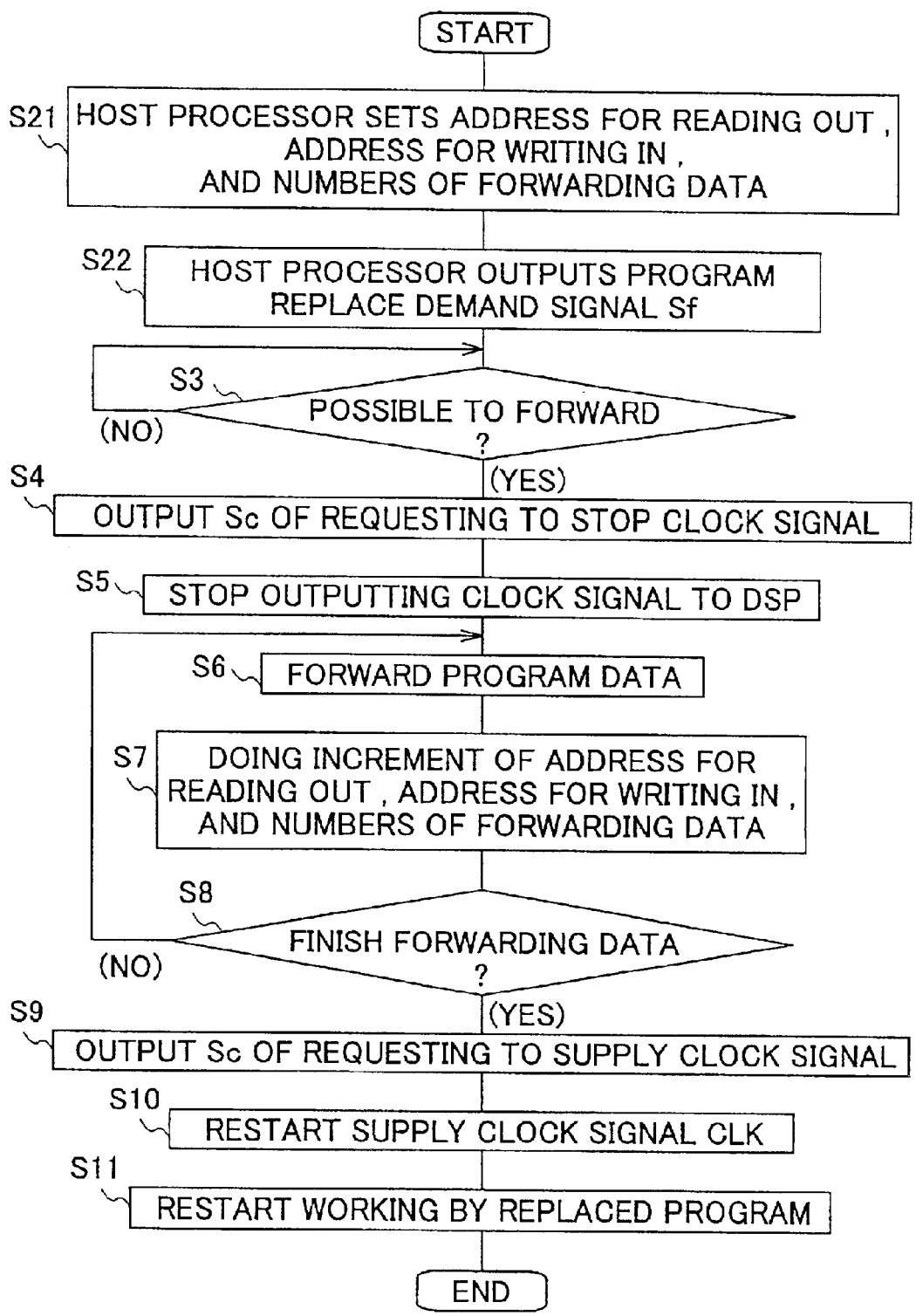
FIG. 3 is a flowchart showing another example of an action of the DSP signal processing apparatus of FIG. 1.

Referring to FIG. 3, first of all, in step 21, the host processor 15 implements a setting up process of the forward circuit 5, an address of external ROM 4 starting reading out the program data, an address of internal program RAM 3 writing the program in, and the number of forwarding the data, with respect to the register in the forward circuit 5 and the like for instance. Next, the host processor 15 outputs the request signal Sf to replace the program to the forward circuit 5 in step 22. After that, the processes from the step 3 to the step 11 are implemented.

Thus, according to the present embodiment of the DSP signal processing apparatus 1, when the program stored in the internal program RAM 3 in the DSP 2 is replaced, the forward circuit 5 stops that the clock control circuit 7 supplies the clock signal CLK to the DSP 2, reads out the desired program stored in the external ROM 4, and makes the internal program RAM 3 renew and store the program. As finish of the forwarding, the clock control circuit 7 restarts supplying the clock signal CLK to the DSP 2. Accordingly, if a state in which it is necessary that the program in the internal program RAM is replaced during that the DSP works happens, it is possible to replace the program in the internal program RAM without resetting the DSP, so that it is possible to carry out large scale program by the internal program RAM whose memory scale is small without falling the performance of the DSP. Furthermore, it is possible to reduce consumption of electricity because it is stopped to supply the clock signal to the DSP during that the change of the program in the internal program RAM.

Figure 4:
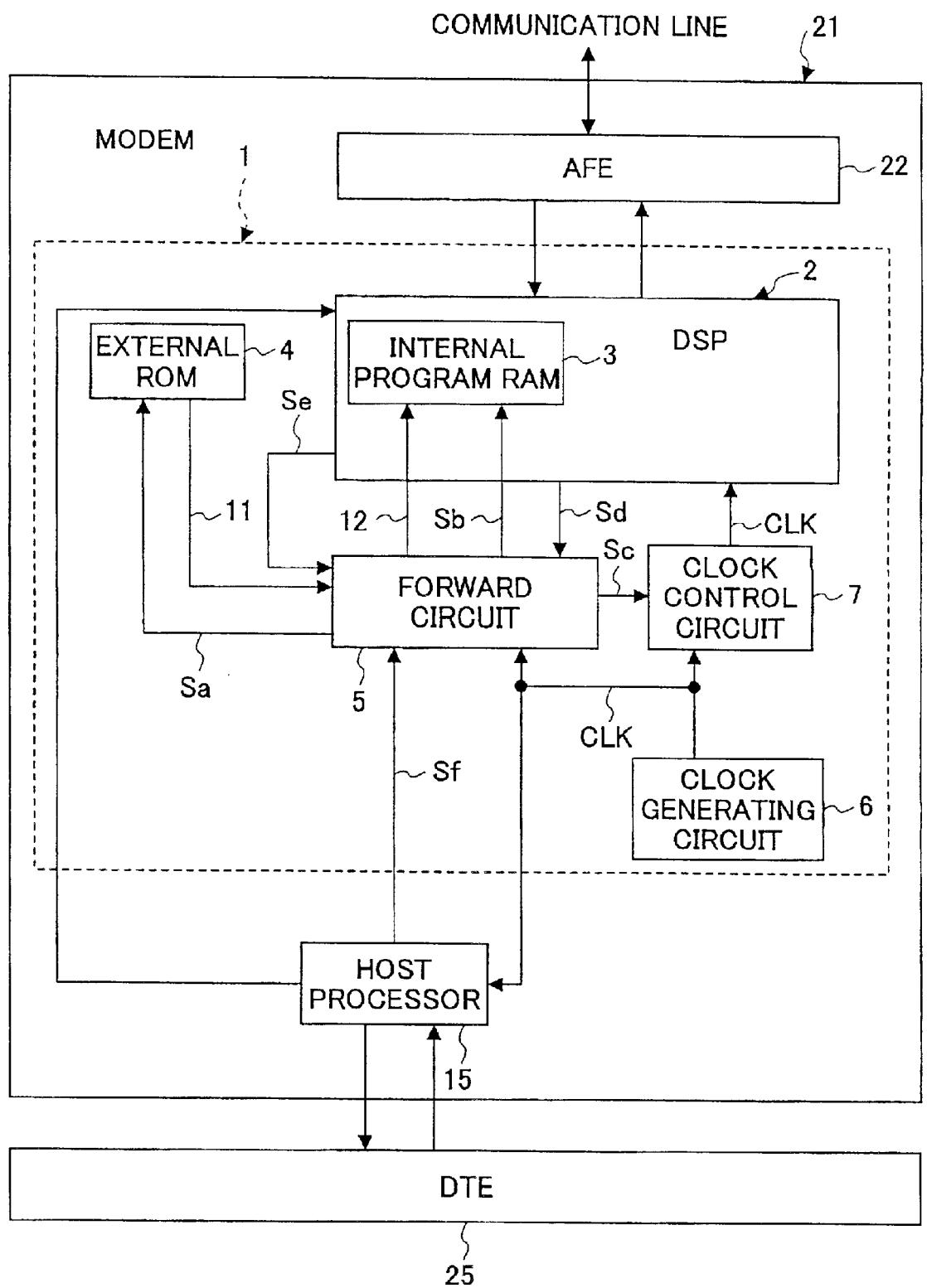
FIG. 4 is a block diagram showing an example of a modem using the DSP signal processing apparatus of FIG. 1.

FIG. 4 is a block diagram showing an example of a modem using the DSP signal processing apparatus 1 of FIG. 1. The same parts as ones in FIG. 1 are mentioned with the same mark in FIG. 1 and the explanation with respect to the same parts as ones in FIG. 1 will be omitted.

Referring to FIG. 4, a modem 21 comprises the DSP signal processing apparatus 1, the host processor 15, and an analog front end (hereinafter "AFE") 22 converting an analog signal in a communication circuit such as a public circuit system and the like into a digital signal The DSP 2 is connected to the communication circuit such as the public circuit system and the like through the AFE 22. The host processor 15 is connected a data terminal equipment (hereinafter "DTE") 25 comprising an information process apparatus such as a personal computer and the like. In case of that the DTE 25 is the personal computer, the host processor 15 is connected to the DTE 25 by an RS232C for instance. The DSP 2 implements data modulation/demodulation in the modem 21. The host processor 15 mainly transfers data with the DTE 25, controls the whole of the modem 21, and like that. The host processor 15 is also connected with the forward circuit 5 and the DSP 2.

In case of that the data from the DTE 25 is transmitted to the communication circuit, the data outputted from the DTE 25 to the host processor 15 is converted in accordance with a protocol provided by the host processor 15 and is outputted to the DSP 2 as modulation data. The DSP 2 modulates the inputted data to the DSP 2 according to the program stored in the internal program RAM 3 and converts the input data to the DSP 2 to a digital signal in a telephone system area. The digital signal converted by DSP 2 is converted to an analog signal by the AFE 22 and then transmitted to the communication circuit such as a public circuit system.

In case of that the data is received from the communication circuit such as a public circuit system to the DSP 2, the analog signal received from the communication circuit such as a public circuit system is converted to the digital signal by AFE 22 and input to the DSP 2. The DSP 2 demodulates the inputted data to the DSP 2 according to the program stored in the internal program RAM 3 and outputs to the host processor 15. The host processor 15 converts the input demodulation data to the receiving data in accordance with a protocol provided by the host processor 15 and outputs the DTE 25. The DSP 2 calculates the modulation/demodulation according to the program stored in the internal program RAM 3. The calculation for the modulation/demodulation depends on the advice to be applied. The explanation with respect to the action to replace the program in the internal program RAM 3 in the DSP signal processing apparatus 1 will be omitted because the action has already been explained in the FIGS. 1 to 3.

Thus, it is not necessary to reset an inside parameter of the DSP 2 and the parameter of the AFE 22 and the like after the program in the internal program RAM 3 is replaced, so that the modulation/demodulation program can be carried out immediately, by using the DSP signal processing apparatus 1 according to the above embodiment to the modem. Therefore, as compared with the modem of prior arts, it is possible to reduce a possibility in that the communication is cut in case of that the program is replaced. Besides, in case of that parameters only related to transmitting and receiving are different in a state where a carrier frequency and a modulation rate are different even if modular formulation is same, it is possible to keep the modulation formulation program and change only parameters, because it is possible to change not all but a part of the modulation/demodulation program.

The present invention is not limited to these embodiments, but various and modifications may be made without departing from the scope of the present invention.

What claimed is:

1. A signal processing apparatus comprising:
    a digital signal processor comprising an internal memory part storing a program to be executed;
    an external memory part storing programs executable in said digital signal processor;
    a clock signal generating part generating a clock signal and outputting the clock signal to said digital signal processor; and
    a clock signal control part controlling outputting of said clock signal to said digital signal processor so that said programs stored in said external memory part can be forwarded to said internal memory part,
    wherein the control of output of the clock signal is performed without initializing said digital signal processor, and
    wherein the clock signal is stopped for transfer of the programs to the internal memory part.

2. The signal processing apparatus as claimed in claim 1, wherein said clock signal control part forwards said programs read from said external memory part to said internal memory after stopping outputting said clock signal to said digital signal processor.

3. The signal processing apparatus as claimed in claim 1, wherein said clock signal control part comprises a forward circuit part and a clock control part, said clock control part stops outputting said clock signal to said digital signal processor after said forward circuit part supplies said clock control part with a signal requesting that said clock control part stops outputting said clock signal to said digital signal processor so that said programs stored in said external memory part can be forwarded to said internal memory part.

4. The signal processing apparatus as claimed in claim 3, wherein said clock control part restarts outputting said clock signal to said digital signal processor after said forward circuit part supplies said clock control part with a signal requesting that said clock control part outputs said clock signal to said digital signal processor when said programs stored in said external memory part are completely forwarded to said internal memory part.

5. The signal processing apparatus as claimed in claim 1, wherein said clock signal control part controls outputting of said clock signal to said digital signal processor in compliance with a request from said digital signal processor.

6. The signal processing apparatus as claimed in claim 1, wherein said clock signal control part controls outputting of said clock signal to said digital signal processor in compliance with a request from an outside of said signal processing apparatus.

7. The signal processing apparatus as claimed in claim 1, wherein said clock signal control part comprises a forward circuit for forwarding a desired part of said programs read from said external memory part to said internal memory.

8. The signal processing apparatus as claimed in claim 1, wherein said clock signal control part stops output of said clock signal to said digital signal processor in response to a request from said digital signal processor.

9. The signal processing apparatus as claimed in claim 1, wherein when said clock signal control part stops output of said clock signal to said digital signal processor, said digital signal processor cannot access said internal memory part.

10. The signal processing apparatus as claimed in claim 1, wherein said clock signal control part stops output of said clock signal to said digital signal processor, to cause said digital signal processor to stop executing the program stored in said internal memory part.

11. A modem for modulating/demodulating a communication data by using a signal processing apparatus comprising:
a digital signal processor comprising an internal memory part storing a program to be executed;
an external memory part storing programs executable in said digital signal processor;
a clock signal generating part for generating a clock signal and outputting the clock signal to said digital signal processor; and
a clock signal control part controlling outputting of said clock signal to said digital signal processor so that said programs stored in said external memory part can be forwarded to said internal memory part,
wherein the control of output of the clock signal is performed without initializing said digital signal processor, and
wherein the clock signal is stopped for transfer of the programs to the internal memory part.

12. The modem as claimed in claim 11, wherein said clock signal control part forwards said programs read from said external memory part to said internal memory after stopping outputting said clock signal to said digital signal processor.

13. The modem as claimed in claim 11, wherein said clock signal control part comprises a forward circuit part and a clock control part, said clock control part stops outputting said clock signal to said digital signal processor after said forward circuit part supplies said clock control part with a signal requesting that said clock control part stops outputting said clock signal to said digital signal processor so that said programs stored in said external memory part can be forwarded to said internal memory part.

14. The modem as claimed in claim 13, wherein said clock control part restarts outputting said clock signal to said digital signal processor after said forward circuit part supplies said clock control part with a signal requesting that said clock control part outputs said clock signal to said digital signal processor to said clock control part, after said programs stored in said external memory part are completely forwarded to said internal memory part.

15. The modem as claimed in claim 11, wherein said clock signal control part controls outputting of said clock signal to said digital signal processor in compliance with a request from said digital signal processor.

16. The modem as claimed in claim 11, wherein said clock signal control part controls outputting of said clock signal to said digital signal processor in compliance with a request from an outside of said signal processing apparatus.

17. The modem as claimed claim 11, wherein said clock signal control part comprises a forward circuit for forwarding a desired part of said programs read from said external memory part to said internal memory.

* * * * *